US008239769B2

(12) United States Patent
Ruiz-Velasco et al.

(10) Patent No.: US 8,239,769 B2
(45) Date of Patent: Aug. 7, 2012

(54) SYSTEM AND METHOD FOR SELLING PREFERENCE-BASED VIRTUAL OBJECTS

(75) Inventors: Enrique Ruiz-Velasco, Flower Mound, TX (US); Senthil K. Raghavan, Dallas, TX (US); Mohammad Usman Lakhani, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 910 days.

(21) Appl. No.: 12/107,471

(22) Filed: Apr. 22, 2008

(65) Prior Publication Data

US 2009/0265636 A1    Oct. 22, 2009

(51) Int. Cl.
*G06F 3/048* (2006.01)
(52) U.S. Cl. ........ 715/738; 715/733; 715/765; 715/810; 707/758

(58) Field of Classification Search .................. 715/733, 715/738, 764, 765, 810, 205; 707/723, 749, 707/758; 725/32, 34, 35, 37–39, 44–46, 725/61, 86, 87, 91, 109, 110, 114, 115, 131
See application file for complete search history.

(56) References Cited

U.S. PATENT DOCUMENTS

| | | | |
|---|---|---|---|
| 7,853,600 B2 * | 12/2010 | Herz et al. ................... 707/749 |
| 2007/0208718 A1 * | 9/2007 | Javid et al. ..................... 707/3 |
| 2009/0094656 A1 * | 4/2009 | Carlucci ..................... 725/115 |
| 2009/0158170 A1 * | 6/2009 | Narayanan et al. .......... 715/753 |
| 2010/0094866 A1 * | 4/2010 | Cuttner et al. ............... 707/723 |

* cited by examiner

*Primary Examiner* — Xiomar L Bautista

(57) ABSTRACT

A system and method for selling preference-based virtual objects comprising receiving one or more user commands from an input device, transmitting, to at least one server, the one or more user commands to identify one or more preference-based virtual objects based on the one or more user commands, receiving the one or more preference-based virtual objects in response to the identification of the one or more preference-based virtual objects, and outputting, to a display device, the one or more preference-based virtual objects in response to receiving one or more user inputs to display the one or more preference-based virtual objects to the display device.

18 Claims, 7 Drawing Sheets

500

502 — Collecting one or more user commands

504 — Identifying one or more preference-based virtual objects based on the one or more user commands 506 — Transmitting the one or more preference-based virtual objects for display at a display device

Figure 5

SYSTEM AND METHOD FOR SELLING PREFERENCE-BASED VIRTUAL OBJECTS

BACKGROUND INFORMATION

Recently, virtual objects have become important commodities for consumers that interact with virtual communities. In addition, virtual marketplaces have become increasingly useful as resources for virtual objects. In many instances, consumers access these virtual marketplaces via the internet using a computer to access and/or purchase virtual objects. As a result, most consumers are limited to accessing and/or purchasing virtual objects using computers. Because of advances in recent technology, televisions are providing consumers with additional access to multimedia technology functionality. However, only a few televisions are enabled to support the access and/or purchase of virtual objects by consumers.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

FIG. 5 depicts a flowchart of another method for selling preference-based virtual objects, according to an exemplary embodiment.

These and other embodiments and advantages will become apparent from the following detailed description, taken in conjunction with the accompanying drawings, illustrating by way of example the principles of the various exemplary embodiments.

DETAILED DESCRIPTION OF EMBODIMENTS

The description below describes elements of a system architecture that may include one or more modules, some of which are explicitly shown in the figures, others that are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

The description below also describes physical and logical elements of a system architecture, some of which are explicitly shown in figures, others that are not. The inclusion of some physical elements of a system architecture may help illustrate how a given system may be modeled. It should be noted, however, that all illustrations are purely exemplary and that the system architecture described herein may be performed on different varieties of systems which may include different physical and logical elements.

Figure 1:
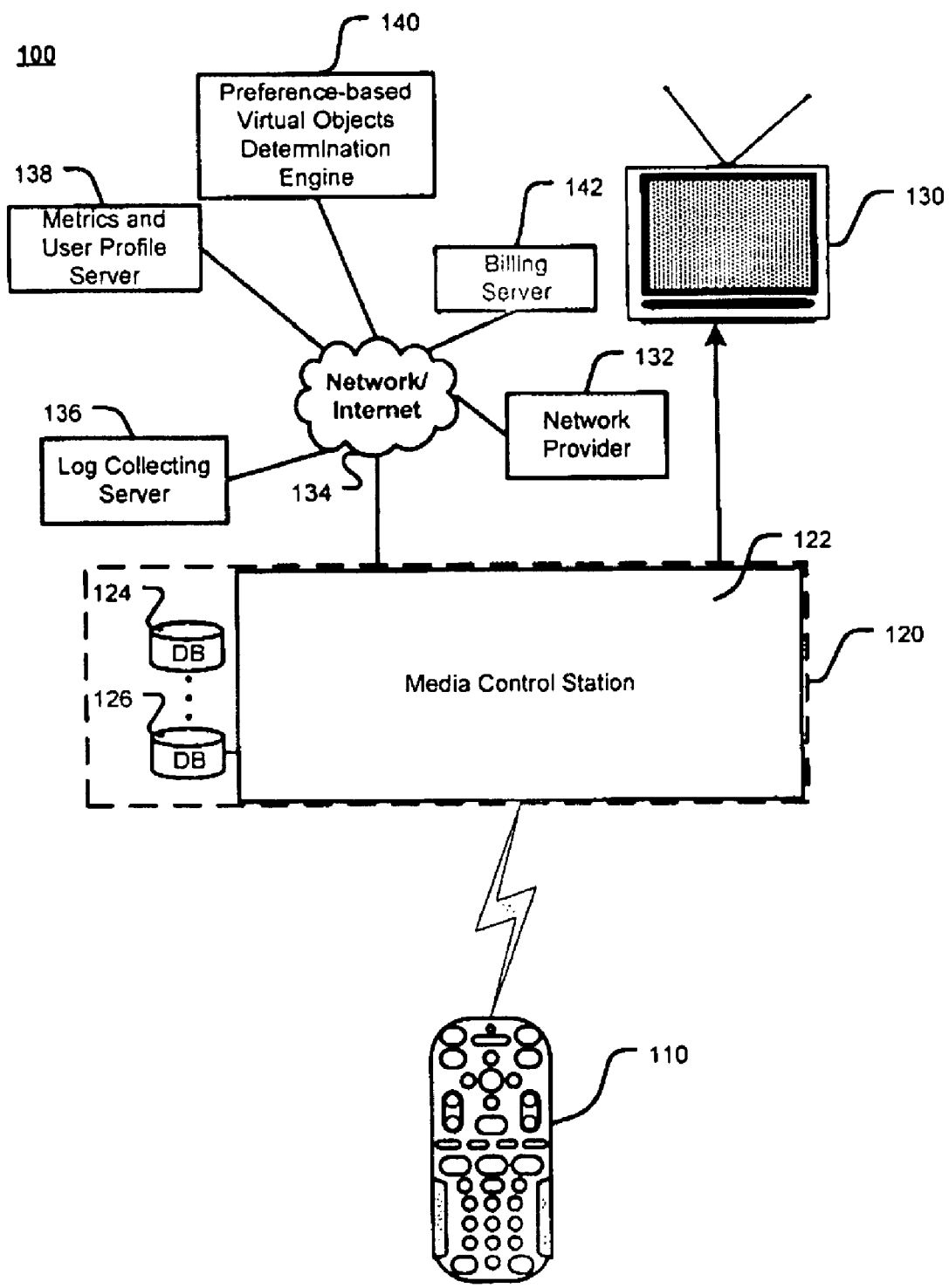
FIG. 1 depicts a block diagram of a system architecture for selling preference-based virtual objects, according to an exemplary embodiment.

For instance, system 100 from FIG. 1 illustrates a simplified view of a system architecture for selling preference-based virtual objects and various elements in the system architecture for selling preference-based virtual objects. It is noted that other hardware and software not depicted may be included in system 100. It will be appreciated that a single instance and/or multiple instances of the entities of system 100 may be included in a system.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof.

A system architecture for selling preference-based virtual objects may operate through a television network. Using the television network, the system may transmit virtual object data to a media box and/or display device associated with a user. Accordingly, the user may use a remote control device and/or a media box associated with the display device, to access, view, purchase and/or send the virtual object data transmitted by the system.

In various embodiments, a system for selling preference-based virtual objects may be configured to provide one or more virtual objects to a display device associated with a user based on user preferences. A user may be able to access, view, purchase, and/or send one or more virtual objects using a remote control device and/or media box associated with the display device. A virtual object may include an object (e.g., an avatar virtual object, a gift card virtual object, a ring tone virtual object, a seasonal virtual object, etc.) created, simulated, and/or carried on by means of a computer and/or computer network.

In various embodiments, the system may be configured to obtain user preferences by collecting and/or analyzing user viewing habits, user profile information, and/or any other information that may used to identify user preferences. Based on the user preferences, the system may be configured to identify, transmit, and/or offer for sale one or more preference-based virtual objects to a user using a display device and/or media box. For example, the system may obtain and/or analyze user preferences that indicate that a user likes to watch science fiction movies. Based on these user preferences, the system may offer for sale the user one or more science fiction based avatar virtual objects, such as, a "Luke Skywalker" avatar virtual object and/or a "Darth Vader" avatar virtual object, using the media box and/or display device associated with the user. An avatar virtual object may include a virtual object that may be associated with human-like qualities.

In various embodiments, the system may be configured to provide and/or offer for sale a user avatar virtual objects, gift card virtual objects, ring tone virtual objects, and/or seasonal virtual objects using a display device and/or media box associated with the user. In various embodiments, the system may be configured to provide and/or offer for sale virtual objects based on the user's preferences. In various embodiments, the system may be configured to provide and/or offer for sale any virtual object. To access and/or purchase the virtual objects, the user may access a virtual object market place associated with the system using a display device, media box, and/or remote control device.

FIG. 1 depicts a block diagram of a system 100 architecture for selling preference-based virtual objects, according to an exemplary embodiment. The system 100 may comprise a subscriber side and/or a vendor side. The subscriber side of the system 100 may comprise a remote control device 110, a media box 120, and/or a display device 130. The display device 130 may include a television, a monitor, and/or any other device capable of displaying media signals. Media box 120 may include a media control station 122 and/or one or more databases 124, 126. The media control station 122 may include a receiver to receive one or more commands/signals from the remote control device 110, receive one or more content signals (e.g., streaming media, television programs, virtual object data, etc.) from one or more network providers servers via a network/internet 134 (e.g., cable, satellite, etc.), and an output to provide media signals and/or virtual object data to display at the display device 130. The vendor side of the system 100 may comprise a Log Collecting Server 136, a Metrics and User Profile Server 138, a Preference-based Virtual Object Identification Engine 140, and a Billing Server 142 connected to the one or more network providers 132 and the media control station 122 via the network/internet 134. It will be appreciated that not all components of the system 100 may be illustrated in FIG. 1. Other variations and components may also be provided, such as a Content Information Server (e.g., from which content/information may be fetched), a viewer interface, additional inputs/outputs, etc.

The remote control device 110 may transmit and/or receive signals to/from the media box 120. Signal transmission by the remote control device 110 may include a variety of wireless signaling pathways, such as infrared, Bluetooth™, local area wireless network (e.g. 802.11 based protocols), and/or other similar signaling applications for communicating between the remote control device 110 and the media box 120 or other similar devices. Other various embodiments may also be provided.

It should be appreciated by one of ordinary skill in the art that the remote control device 110 may come in a variety of shapes, sizes, textures, and functionalities with an assortment of buttons and/or labels. Additionally, the remote control device 110 may use various technologies (e.g., wired or wireless technologies) to communicate with external devices. Furthermore, the remote control device 110 may include various playback features, alphanumeric entries/buttons, and other similar functions. It should also be appreciated that other devices having alphanumeric and/or similar remote control capabilities may be used as remote control devices as well. These may include desktop computers, laptops, game controllers, mobile communication devices, such as personal digital assistants (PDAs), mobile phones, smart phones, as well as other devices that may transmit and/or receive signals to/from the media box 120.

Databases 124, 126 may store information received from one or more network providers 132 and/or the servers 136, 138, 140, and 142. Exemplary database information may include preference-based virtual object information, network provider information, TV program channel numbers, TV program channel names, program listings, program schedules for each of the programs, future and past programming information, ratings, user preferences, advertisement categories, advertisers, advertised product/service, and/or other information provided by a user or TV network provider 132 or storage source (e.g., pre-recorded TV programs/movies). Although shown as two separate databases, it should be appreciated that the contents of these databases may be combined into fewer or greater numbers of databases and may be stored on one or more data storage systems and/or servers. Furthermore, the databases 124, 126 may be local, remote, or a combination thereof to the media box 120.

Additionally, the databases 124, 126 may also store information associated with a virtual market place and/or identifying preference-based virtual objects. This information may include user/viewer channel preferences, preferred TV programs/channels, preferred TV viewing times, user profile information, purchasing habits associated with previously purchased virtual objects, seasonal purchasing habits, and/or other preferred or customized information. Such information may be useful in providing and/or offering for sale one or more virtual objects associated with user preferences. Other variations may also be provided.

Log Collecting Server 136 may include one or more processors (not shown) for recording and storing data and/or information from one or more users through the media box 120. The data and/or information may be stored and indexed in one or more databases (not shown) by the one or more processors of the Log Collecting Server 136. In this example, the stored data and/or information may include, but is not limited to, a user's viewing habits and/or preferences, e.g., preferred TV programs/channels, consistency in viewing various TV programs/channels, time of day these are viewed, duration of viewing, frequency of channel-changing from or to various programs/channels, types of channels/programs viewed, etc. In various embodiments, the stored data and/or information may also include paid programming (e.g., Video on Demand and/or Pay-per-view), shows that are recorded using a personal video recorder (PVR) or other similar device (e.g., a digital video recorder (DVR), or other media (e.g., Internet videos, music, etc.). In various embodiments, the stored data and/or information may also include user profile information (e.g., favorite tv shows, favorite movies, favorite songs, favorite actors/actresses, hobbies, educational background, state of origin, etc.). In various embodiments, the stored data and/or information may also include previously purchased virtual objects.

In various embodiments, the Log Collecting Server 136 may utilize processor logic to identify the desired data and/or information to be recorded and stored. In addition, the Log Collecting Server 136 may record and store the data and/or information based on a user's manual input of habits and/or preferences. The Log Collecting Server 136 may include additional processing logic to sort and index the one or more recorded and stored data/information.

Storing and indexing the data/information may further allow the processing logic to cross-reference the various data/information for forming personal preferences. For example, this may include identifying commonalities in programs/channels viewed, such as type, genre, channel, or programs created or performed by a particular entity (e.g., a particular actor/actress, director, producer, sports team, etc.). In another example, this may include frequency of recording programs/ channels or use of PVR/DVR (Personal Video Recorder/ Digital Video Recorder) features. Other various embodiments may also be provided.

Metrics and User Profile Server 138 may include one or more processors (not shown) for storing and retrieving data and/or information from the Log Collecting Server 136. The data and/or information may be stored and indexed in one or more databases (not shown) by the one or more processors of the Metrics and User Profile Server 136. The Metrics and User Profile Server 138 may utilize processor logic to create, store, and retrieve user data and/or information based on user profiles corresponding to various users. A user profile may include a collection of various user preferences. Since user preferences may be stored in user profiles, similarities and differences between various users may be more readily obtained. Other various user profile embodiments may also be utilized.

In various embodiments, the Metrics and User Profile Server 138 may interact with the Log Collecting Server 136 and/or the Preference-based Virtual Objects Identification Engine 140 to store and/or update user profiles. In various embodiments, the Metrics and User Profile Server 138 may interact with other servers, such as marketing servers (not shown), to generate usage reports on the various user profiles and user profile types. The Metrics and User Profile Server 138 may further cross-reference the various data/information to compare various user profiles and form new categories based on various degrees of similarity. Other various embodiments may also be provided.

Preference-based Virtual Objects Identification Engine 140 may include one or more processors (not shown) for identifying and/or providing preference-based virtual object data and/or virtual object information to one or more users through the media box 120. The virtual object data and/or virtual object information may be stored and indexed in one or more databases (not shown) by the one or more processors of the Preference-based Virtual Objects Identification Engine 140. For example, the Preference-based Virtual Objects Identification Engine 140 may identify, provide, and/or offer for sale one or more virtual objects to a user based on the user's personal viewing history, which may be retrieved from data and/or information stored at the Log Collecting Server 136. In various embodiments, the preference-based virtual objects may be identified based on a user's preferred TV programs/channels based on consistency in viewing various TV programs/channels, duration of viewing, frequency of channel-changing from or to various programs/channels, types of channels/programs viewed, consumer popularity, etc. In various embodiments, the preference-based virtual objects may be identified based on a user's past purchasing habits associated with the purchase of virtual objects and/or past purchasing habits of other users with similar user profiles. In various embodiments, the preference-based virtual objects may be identified based on user profile information (e.g., user preferences, etc.), viewing history, habits of other users (e.g., user profiles, etc.) exhibiting similar patterns as a particular user. Other various embodiments may also be provided.

Billing server 142 may include one or more processors (not shown) for receiving and/or processing purchasing information associated with a user's purchase of one or more preference-based virtual objects through the media box 120. The purchasing information may include a user's selection of a preference-based virtual object, a user's unique identification number, a user's authorization to charge the user's service account for the price of one or more preference-based virtual objects, an identification of one or more other users associated with the community the user has purchased the one or more preference-based virtual objects for, and/or any other information needed to process a purchase of one or more preference-based virtual objects.

In various embodiments, the billing server 142 may be configured to receive a user's unique identification number to process the purchase of one or more preference-based virtual objects. For example, a user's unique identification number may be associated with credit card information, check card information, checking account information, savings account information, service account information, and/or any other information needed for the billing server 142 to charge the user for the purchase of the one or more preference-based virtual objects. For example, Tom may be interested in purchasing virtual coins to add to his virtual coin collection. By accessing the virtual objects market place associated with his media box, Tom may search for and/or select virtual coins of interest. To purchase these virtual coins, Tom may input purchasing information to the billing server 142 via a remote control device 110 and/or a media box 120. In various embodiments, Tom may input authorization for the billing server 142 to charge a service account previously established by using a unique identification number.

In various embodiments, the billing server 142 may be configured to receive and/or access points as payment for one or more virtual objects. For example, the system 100 may be configured such that a user of system 100 may receive one or more points for purchasing one or more virtual objects. After collecting a sufficient amount of points, the user may use the points to purchase one or more virtual objects. In various embodiments, the user may receive points for purchasing virtual objects, maintaining an account with system 100, the user birthday, and/or any other method of receiving points determined based on design preferences. In various embodiments, the user may pay for one or more virtual objects using points only and/or using a combination of points and another payment method (e.g., credit card, charge account, debit card, cash card, etc.).

In various embodiments, the billing server 142 may be configured to transmit one or more preference-based virtual objects purchased by a user to other users associated with the community by transmitting virtual object data to one or more media boxes associated with the other users. For example, John may purchase a gift card virtual object on behalf of Tom by accessing the virtual objects market place associated with his media box. John may input purchasing information and/or information to identify Tom (e.g., Tom's full name, Tom's user profile name, etc.). Based on this information, the billing server 142 may process the purchase of the gift card virtual object by charging an account associated with John and may transmit the gift card virtual object information to a media box and/or user profile associated with Tom.

Although each of the Log Collecting Server 136, the Metrics and User Profile Server 138, the Preference-based Virtual Objects Identification Engine 140, and the Billing Server 142 is depicted as one server, it should be appreciated that the contents of the each of these server may be combined into fewer or greater numbers of servers (or server-like devices, such as modules) and may be connected to one or more data storage systems. Furthermore, each of these servers may be local, remote, or a combination thereof to the media box 120. Other various embodiments may also be provided. In addition, it should be appreciated that while a telephone line is not depicted in any of the figures, one of ordinary skill in the art would recognize that telephone lines may be utilized for transmitting data and/or information between the various components of system 100. For example, a user who desires to pay for one or more preference-based virtual objects may transmit his or her selection to the billing server 142 via a telephone line.

By monitoring, tracking, storing, and/or indexing a user's viewing habits, user's purchasing habits, user preferences, and/or TV-navigation habits, as discussed above, preference-based virtual objects may be provided. Not only does this provide an effective and improved technique for accessing and/or purchasing virtual objects, it also provides users with the ability to do so in an efficient manner. As a result, overall multi-media experiences may be further enhanced because users may spend less time searching for virtual objects of interest and more time enjoying their preferred virtual objects.

As previously discussed, a system 100 for selling preference-based virtual objects may be configured to provide and/or offer for sale one or more preference-based virtual objects. These virtual object may include seasonal virtual objects, ring tone virtual objects, avatar virtual objects, and/or gift card virtual objects based on user preferences.

A seasonal virtual object may include one or more virtual objects associated with a season, such as, Fall, Winter, Spring, Summer. For example, a Fall virtual object may include a virtual tree with colorful leaves, a Winter virtual object may include a virtual snow man, a Spring virtual object may include a virtual flower, and a Summer virtual object may include a virtual sun. A seasonal virtual object may include one or more virtual objects associated with a holiday (e.g., Christmas, Valentine's Day, Fourth of July, etc.) In various embodiments, a seasonal preference-based virtual object may include a virtual object that is associated with a favorite holiday indicated by a user. For example, a user may indicate in a user profile that their favorite holiday is Christmas. Accordingly, during the Christmas season, the system 100 may offer the user one or more Christmas-like virtual objects, such as, a virtual Christmas tree, a virtual gift box, a virtual ornament, etc.

In various embodiments, the system 100 may offer one or more users associated with a community one or more virtual objects that are connected to a hidden prize. For example, during the Christmas season, the system 100 may offer 100,000 virtual Santa Clauses, five of which may be associated with a hidden prize. Accordingly, the one or more users that purchase the five virtual Santa Clauses associated with the hidden prize using the system 100 may win the hidden prize (e.g., free smart phone, free television service for a month, etc.)

A ring tone virtual object may include one or more virtual objects associated with custom ring tones, such as, a voice that yells "Hey, Pick up the phone," the song "Killing me softly," etc. In various embodiments, a preference-based ring tone virtual may include a virtual object that is associated with a favorite movie indicated by a user. For example, a user may indicate in a user profile that their favorite movie is "Star Wars." Accordingly, the system 100 may offer the user one or more Star Wars-like ring tone virtual objects, such as, the theme music to the "Star Wars" movies, a voice that says "Luke, I'm your father," etc.

In various embodiments, the system 100 may be configured to support one or more users creating custom virtual ring tones and subsequently uploading the custom virtual ring tones to a user's mobile telephone and/or user profile. In various embodiments, the system 100 may tag the virtual ring tone associated with a user profile to other user profiles in the community by relating the virtual ring tones created and/or uploaded by users in the community. For example, a user may desire to have the ring tone virtual object that plays the song "Killing me softly." If, for example, the "Killing me softly" ring tone virtual object has not been previously created and/or uploaded to the system 100, the user may create the ring tone virtual object using the system 100. Furthermore, the user may upload the "Killing me softly" ring tone virtual object to his/her user profile and/or his/her cell phone using the system 100. Accordingly, the system 100 may tag the "Killing me softly" ring tone virtual object associated with the user's profile to enable the sharing of ring tone virtual objects among users in a community.

In various embodiments, the system 100 may be configured to support one or more users creating custom virtual video clips and subsequently uploading the custom virtual video clips to a user's mobile telephone, a user profile, and/or any other device that may display the custom virtual video clips. In various embodiments, the system 100 may tag the virtual video clip associated with a user profile to other user profiles in the community by relating the virtual video clip created and/or uploaded by users in the community. In various embodiments, a user in a community may send a virtual video clip to one or more other users in the community. For example, a user may create a custom virtual video clip of himself singing "Happy Birthday" to another user in the community. The user may then use system 100 to send the "Happy Birthday" video clip to the other user. In various embodiments, system 100 may include a video camera and/or a video recording device that may be configured to record video clips.

An avatar virtual object may include one or more virtual objects, such as, a virtual "Luke Skywalker," a virtual "Barbie," a virtual "Seinfeld," etc. In various embodiments, a preference-based avatar virtual object may include a virtual object that is associated with a favorite actor/actress, a favorite video game character, etc., indicated by a user. In various embodiments, a preference-based avatar virtual object may include a virtual object that is identified by the system 100 by monitoring and/or tracking the user's television viewing habits. For example, the system 100 may detect that a user watches the "Star Wars" movies whenever they are showing on television. Based on the user's viewing habits, the system 100 may identify, provide, and/or offer for sale the user an avatar virtual object associated with the "Star Wars" movies, such as, a "Luke Skywalker" avatar virtual object, a "Darth Vader" avatar virtual object, etc.

In various embodiments, the system 100 may be configured to display and/or provide one or more virtual objects that may be tagged to one or more third party providers (e.g., Amazon.com, yahoo.com, etc.). For example, a user may search for and/or view a virtual object of interest. The virtual object of interest may be provided to the system 100 by a third party provider. Accordingly, if the user purchases the virtual object of interest that is associated with the third party provider, the system 100 may receive a commission payment from the third party provider. In various embodiments, the system 100 may receive the total payment from the user and may provide a portion of the total payment to the third party provider.

In various embodiments, the system 100 may use the user's purchasing habits associated with purchasing virtual objects as additional user preferences. For example, if a user purchases one or more "Barbie" avatar virtual objects, the system 100 may use this data to determine that the user likes feminine virtual objects and/or the user is a female. In various embodiments, the system 100 may be configured to enable a user to modify a purchased avatar virtual object. For example, the system 100 may be configured to enable the user to add hair, a mustache, glasses, clothes, and/or any other accessories to an avatar virtual object.

A gift card virtual object may include one or more virtual objects associated with a gift card, such as, a five (5) free movies gift card, a free month of television service gift card, a free month of HBO television subscription gift card, a five (5) free avatars gift card, etc. In various embodiments, a preference-based gift card virtual object may include a virtual object that is associated with a favorite movie, etc., indicated by a user. In various embodiments, a preference-based gift card virtual object may include a virtual object that is identified by the system 100 by monitoring and/or tracking the user's television viewing habits. For example, the system 100 may detect that a user consistently watches paid programming movies. Based on the user's viewing habits, the system 100 may identify, provide, and/or offer for sale the user a gift card virtual object associated with discounted paid programming movies, etc.

Figure 2A:
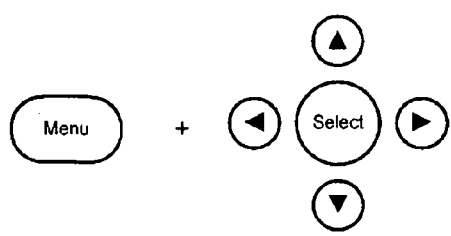
FIG. 2A depicts remote control keys for initiating and navigating a community menu, according to an exemplary embodiment.
Figure 2B:
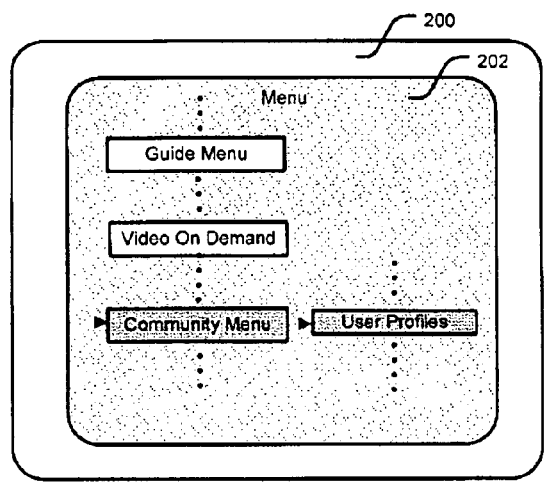
FIG. 2B depicts a screenshot of a community menu, according to an exemplary embodiment.

FIG. 2A depicts remote control keys for initiating and navigating a community menu, according to an exemplary embodiment. FIG. 2B depicts a screenshot of a community menu, according to an exemplary embodiment. A user may initiate navigation of community menus by sending a user command from the remote control device 110 to the media box 120, specifically the media control station 122. A community may include a network of one or more user profiles. Once the media box 120 receives and processes the user command, the media control station 122 may output, at the display device 130, an interactive menu for the user to specify the community menu data to view based on various navigation options.

As depicted in FIG. 2A, a user may press a Menu button (or other similar button or buttons) on the remote control device 110 to send a user command to the media box 120. In response to receiving the user command, the media box 120 may provide an interactive menu 202 to be displayed at the display device 130. For example, the interactive menu 202 may be displayed over (e.g., overlay, etc.) a current screen or video broadcast 200, as depicted in FIG. 2B. In this example, the interactive menu 202 may provide a variety of navigation options for the user to select. In order to search for a community menu, a user may use the remote control device 110 to navigate and select entries by using the arrows and Select button, as depicted in FIG. 2A.

Referring back to FIG. 2B, the interactive menu 202 may provide a variety of navigation options, such as a program guide option, a Video on Demand option, a community menu option, and/or a variety of other viewing functions and/or customizable options. For example, the user may use the arrow keys on the remote control device 110 to navigate and highlight the community menu to retrieve and/or access community menu options, such as, user profiles and/or other community menu options. Further, the user may use the remote control device 110 to further navigate the community menu options. For example, the user may use the remote control device 110 to access user profiles and/or other community menu options.

Figure 2C:
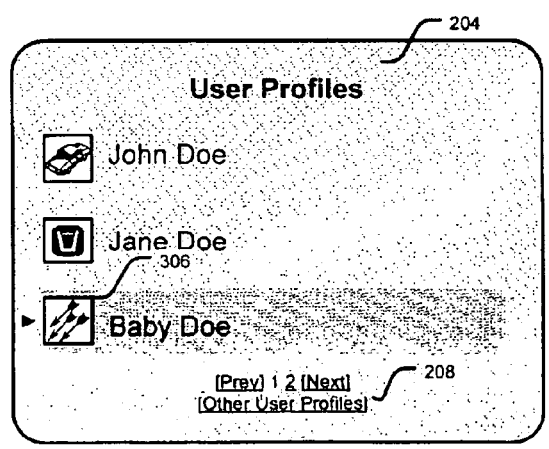
FIG. 2C depicts a screenshot of a user profiles menu, according to an exemplary embodiment.

To access user profiles associated with the system 100, the user may select the user profiles option and be prompted with a user profiles menu 204 listing various user profiles for the user to select from, as depicted in FIG. 2C. In various embodiments, the user profiles menu 204 may include the name for each user associated with the system 100 in household. For example, Baby Doe may be associated with the Baby Doe user profile 206. To access, view, edit, and/or modify the Baby Doe user profile 206, Baby Doe may use the remote control device 110 to highlight and/or select the Baby Doe user profile 206.

In various embodiments, the number of user profiles displayed in a user profiles menu 204 may vary. As depicted in FIG. 2C, three user profiles may be displayed at one time. In order for a user to view other user profiles, the user may link to other pages of the user profiles menu 204 by selecting the addition navigation options 208. Accordingly, the user may move to the next page or previous page of user profiles by selecting "[Prev]", "[Next]", or any one of the page numbers. Other various embodiments may also be provided.

It should be appreciated by one of ordinary skill in the art that the user profiles menu 204 shown in FIG. 2C may be customized. Other various customizable features may include color, size, shape, layout, and navigational options. Furthermore, the information available to the user, as listed in the user profiles menu 204, may not be limited to what is presented in the screen. For instance, it should be appreciated that many of the information components on the screen may be underlined or highlighted to indicate that the user may interact with the screen (e.g., by selecting via the remote control device 110) to pull up additional screens/menus for more detail information on that particular information component/subset. Scroll bars (horizontal and vertical) may also be provided to assist user navigation.

Figure 2D:
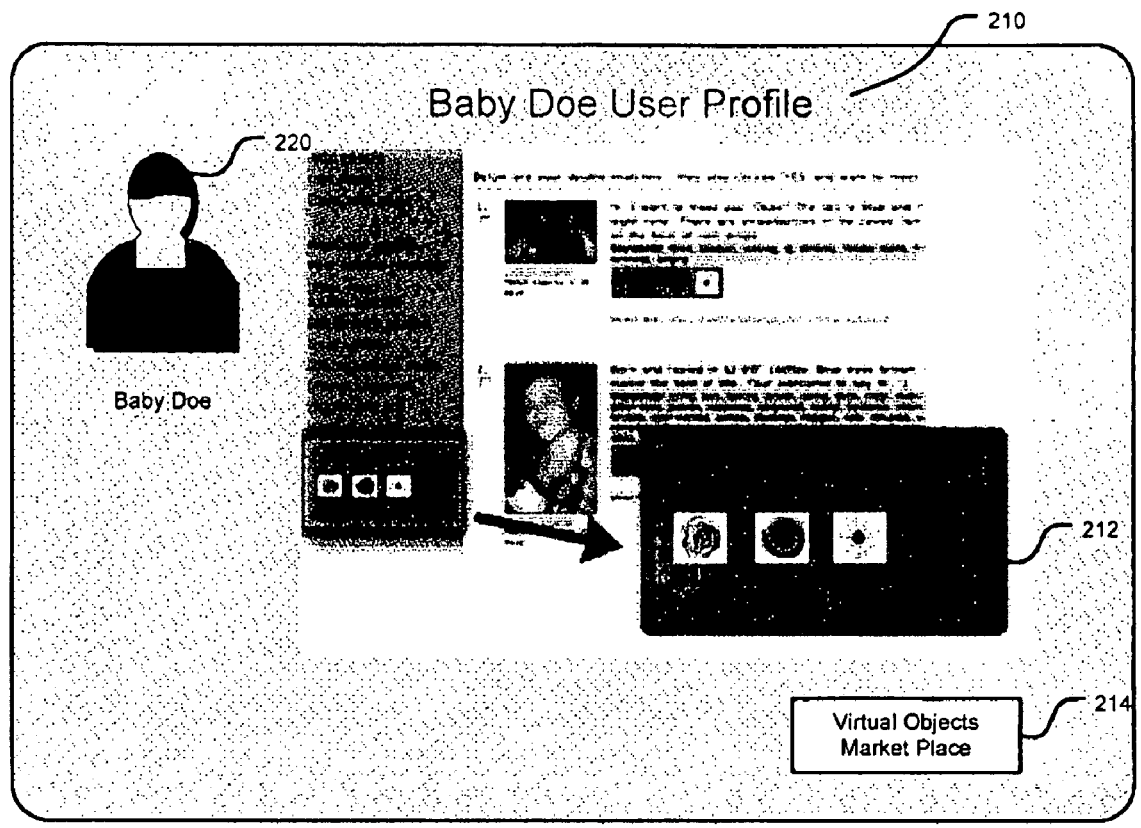
FIG. 2D depicts a screenshot of a user profile, according to an exemplary embodiment.

To access the Baby Doe user profile 206 associated with the system 100, the user may select the Baby Doe user profiles 206 option as depicted in FIG. 2C. In response to receiving the user command, the system 100 may display the Baby Doe user profile screen 210 as depicted in FIG. 2D. In various embodiments, the Baby Doe user profile screen 210 may include a picture 220 (e.g., an avatar, self-portrait, etc.) selected by Baby Doe. In various embodiments, the Baby Doe user profile screen 210 may include a gift inbox 212 and/or a message inbox (not shown). The gift inbox 212 may include a collection of virtual gifts received from others associated with the community. The message inbox may include messages received from the system 100 and/or other users associated with the community. In various embodiments, the Baby Doe user profile screen 210 may include a virtual objects sharing box (not shown) that may be accessed and/or viewed by one or more users associated with the community. The virtual objects sharing box may be configured to support the sharing of one or more virtual objects betweens users associated with the community. The Baby Doe user profile screen 210 may also include a virtual objects market place button 214 that may allow the user to access a virtual objects market place menu.

Figure 2E:
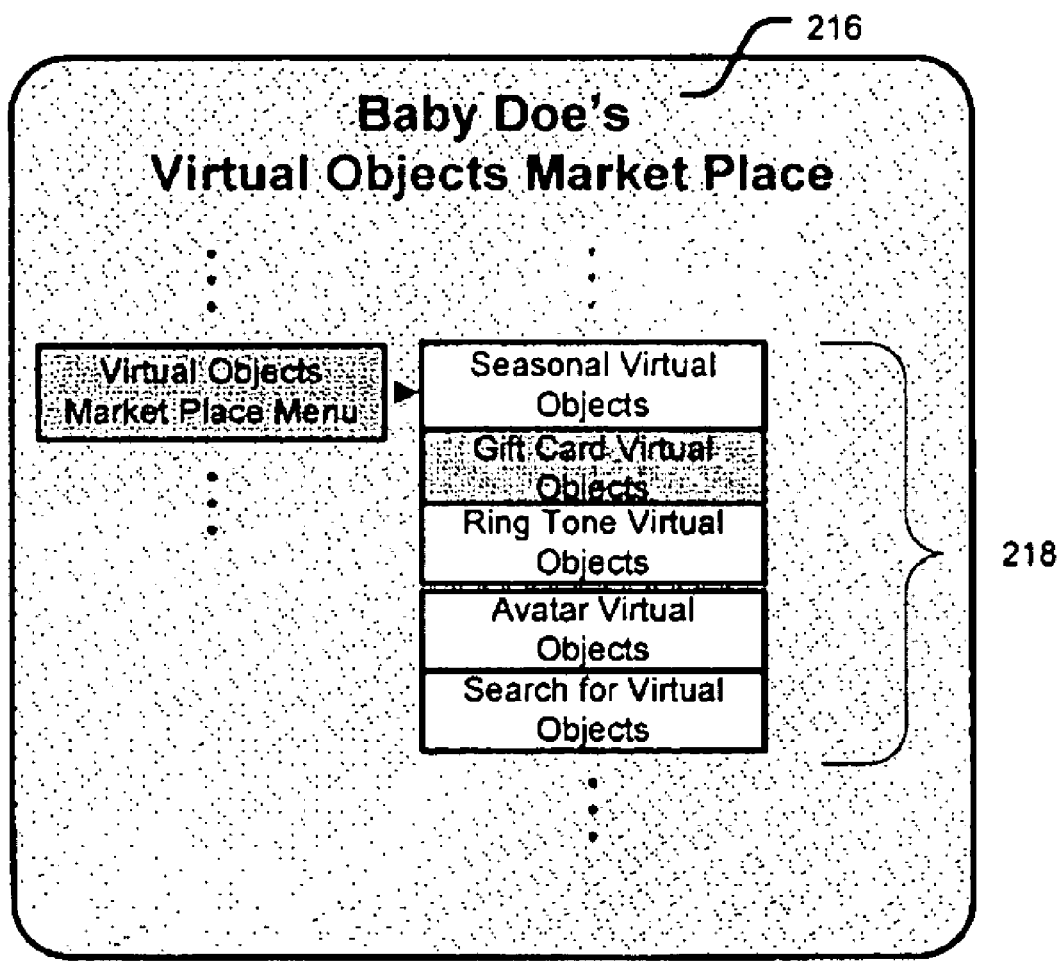
FIG. 2E depicts a screenshot of a virtual objects market place associated with a user profile, according to an exemplary embodiment.

To access the Baby Doe virtual objects market place menu 216 associated with the system 100, Baby Doe may select the virtual objects market place button 214 as depicted in FIG. 2D. In response to receiving the user command, the media box 120 may provide an interactive Baby Doe virtual objects market place menu 216 to be displayed at the display device 130. For example, the interactive Baby Doe virtual objects market place menu 216 may be displayed over a current screen or video broadcast, as depicted in FIG. 2E. In this example, the interactive Baby Doe virtual objects market place menu 216 may provide a variety of navigation options for the user to select. In order to view a Baby Doe virtual objects market place menu 216, a user may use the remote control device 110 to navigate and select entries by using the arrows and Select button.

The interactive Baby Doe virtual objects market place menu 216 may provide a variety of navigation options 218, such as, a seasonal virtual objects option, a gift card virtual objects option, a ring tone virtual objects option, an avatar virtual objects option, a search for virtual objects option, and/or a variety of other virtual objects market place options. To view, access, and/or purchase for preference-based virtual objects associated with any of these options, a user may use a remote control device 110, one or more buttons on a display device 130, one or more buttons on a media box 120, and/or any other input device (e.g., remote control device 110, etc.) to select the preference-based virtual object option of interest. In various embodiments, the system 100 may be configured to provide a variety of preference-based virtual objects that are associated with the user selected option. For example, if user preferences associated with a user indicates that the user is interested in science fiction, the system 100 may provide a "Luke Skywalker" avatar virtual object, a "Darth Vader" avatar virtual object, and/or any other avatar virtual objects associated with science fiction in response to a user's selection of the avatar virtual object option shown in FIG. 2E. By selecting a preference-based virtual object using the remote control device 110, a user may purchase the preference-based virtual object through the system 100.

Figure 3:
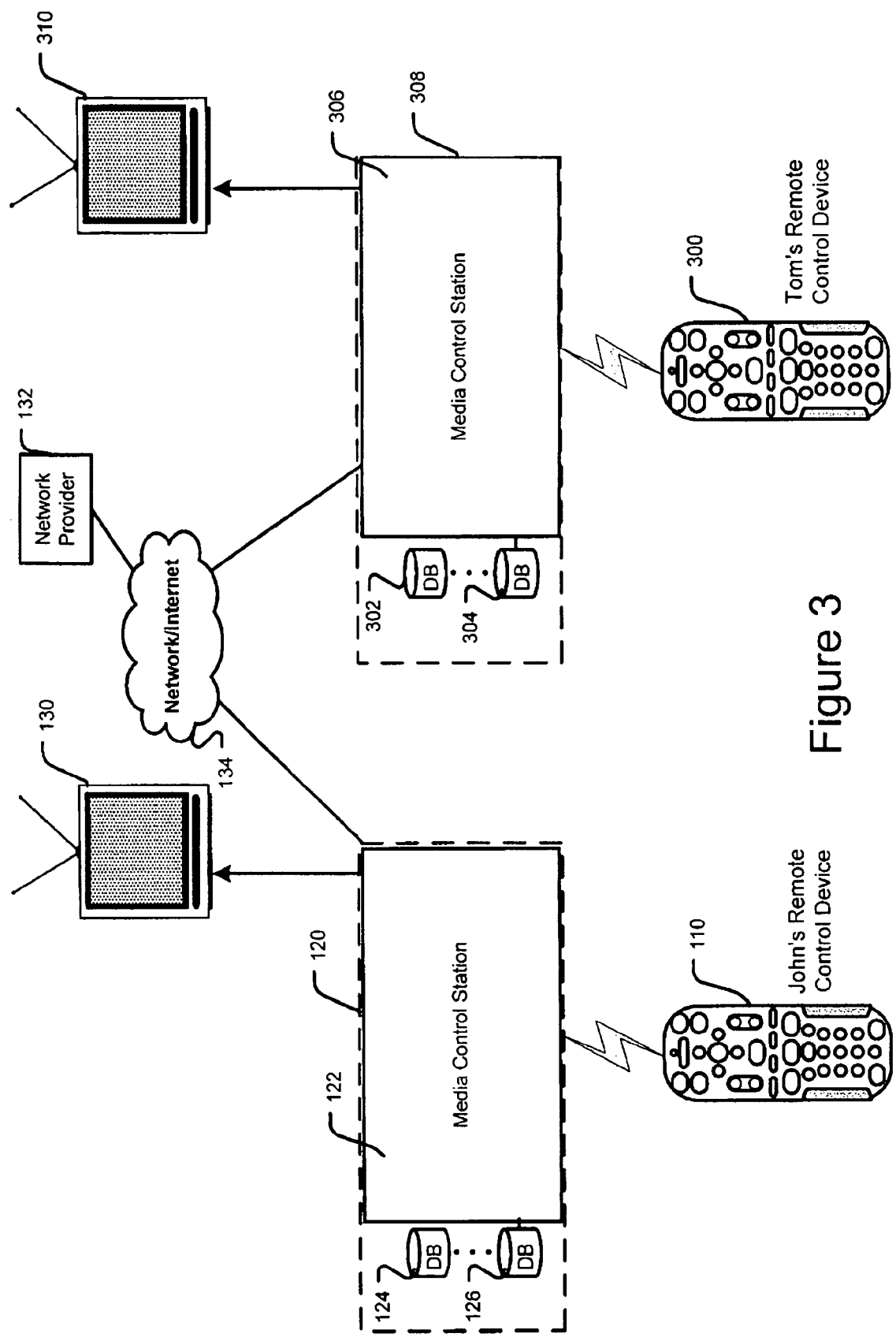
FIG. 3 depicts a block diagram of a system architecture for transmitting virtual objects to another user in a community, according to an exemplary embodiment.

FIG. 3 depicts a block diagram of a system 100 architecture for transmitting virtual objects to another user in a community, according to an exemplary embodiment. As previously discussed, the system 100 may be configured to enable a user to purchase a virtual good on behalf of another user associated with the community. In addition, the system 100 may be configured to send the purchased virtual good to the other user.

For example, John may purchase a gift card virtual object on behalf of Tom (e.g., another user associated with a community via network 134, etc.) by accessing the virtual objects market place displayed on his display device 130 and/or associated with his media box 120. John may input purchasing information and/or information to identify Tom (e.g., Tom's full name, Tom's user profile name, etc.) using an input device, e.g., a remote control device 110. Based on this information, the system 100 may process the purchase of the gift card virtual object by charging an account associated with John and may transmit the gift card virtual object information to a media box 308 and/or user profile associated with Tom. Tom may then access the gift card virtual object using his remote control device 300 and may view the gift card virtual object on his display device 310.

Based on similar hobbies, a user in a community may access and/or view one or more virtual objects associated with another user in the community. In addition, a user in a community may communicate with one or more other users in the community with similar hobbies to exchange one or more virtual objects. For example, Bob may enjoy collecting coins. Bob may access the system 100 to search for other users and/or other virtual objects associated with other users that have an interest in collecting coins. In various embodiments, Bob may exchange one or more coin virtual objects with one or more other users to add to and/or modify his virtual object coin collection.

There are a variety of ways for system 100 to determine a user's viewing habits and/or preferences. In various embodiments, a user may voluntarily input preferences to the system 100. For example, the system 100, through its media box 120, may provide an interactive screen for the user after a television program. In the interactive screen, the user may be asked to give feedback about that television program. The feedback may include a rating, a comment, or other similar feedback, to indicate the user's preference on that television program. The user's voluntary input may generate an explicit rating to be weighted in the calculation of the user's preferences. In various embodiments, the interactive screen may be accessed without having watched a television program. The user may simply input preferences about any previously-watched television program and/or any personal preferences. Feedback entry may be accomplished via the remote control 110. Once the media box 120 receives the remote control entries corresponding to the user's preferences, the data may be stored at the media box 120 or transmitted to the Log Collecting Server 136, Metrics and User Profile Server 138, and/or Preference-based Virtual Objects Identification Engine 140 for storage and processing. Although the interactive screen for feedback entry may be complex (so as to retrieve as much voluntary user input as possible), a simpler interactive screen may be much more efficient and more attractive to users.

In various embodiments, a user may input feedback using a computer device, filling out a hard-copy of a questionnaire, mailing a hard-copy of a questionnaire, speaking to a representative using a telephone, and/or performing any other act to provide the system 100 with feed back information.

Because a user may find it cumbersome to voluntarily enter feedback, the system 100, for example, may utilize a knowledge discovery feature to retrieve a user's preferences by studying the user's viewing habits. The knowledge discovery feature may begin at the remote control device 110 where the user inputs various commands reflective of personal viewing preferences/habits. The media box 120 may log these commands as "raw" data for processing and "discovering" the various actions the user is performing. For example, the media box 120 may receive a command from the remote control 110 to change a channel and/or television program to another. The media box 120 may log the change, the date and time the instructions were received and/or performed, the length and duration of the change, the name of the television program change to and from, the type of television program, whether any other options and/or commands were also received, and other information relating to a user's preferences and habits. This "raw" data may then be transmitted to the Log Collecting Server 136 for further storage and/or processing. The Log Collecting Server 136 may receive this data and learn that the user prefers watching particular television programs on a particular channel. This information may then be processed and stored as one or more user preferences at the Log Collecting Server 136. For example, the processing logic of the Log Collecting Server 136 may take this "raw" data (e.g., how long the user stays a particular channel without changing) and "discover" by inference the user's viewing preferences. In this example, the Log Collecting Server 136 may take the actions performed by the user and infer preferences. These actions may include, but not limited to, television programs and/or television channels watched, television programs recorded, favorites added or tagged, movies purchased, reminders set, queries searched, virtual object market place purchases, series recording priority, consistency in viewing various television programs and/or channels, duration of viewing, frequency of channel-changing from or to various television programs and/or television channels, types of television channels and/or television programs viewed, etc. As a result, the knowledge discovered may be used to generate and/or identify preference-based virtual objects.

In various embodiments, the system 100 may determine a user's viewing habits and/or preferences using a knowledge discovery feature to retrieve a user's preferences by studying the user's viewing habits related to various advertisements. For example, system 100 may access an advertising log to determine the user's viewing habits and/or preferences. An advertising log may include advertisement data associated with the amount of advertisements a user has watched, the type of advertisements the user watches, the amount of time a user changes the channel from one or more advertisements, the amount of time a user watches an advertisement to completion, and/or any other advertisement data associated with identifying user preferences from the user's viewing habits related to advertisements. In various embodiments, the Log Collecting Server 136 may receive the advertisement data. As a result, the knowledge discovered may be used to generate and/or identify preference-based virtual objects.

It should be appreciated that while these preference obtaining techniques discussed above generally relate to the Media Box 120 and the Log Collecting Server 136, one of ordinary skill in the art would recognize that the other servers of the system 100 may be involved in generating preferences as well. For example, the Metrics and User Profile Server 138 and/or the Preference-based Virtual Objects Identification Engine 140 may also provide, receive, and/or process the data from the media box 120 or other sources to generate user preferences.

It should also be appreciated that the knowledge discovery technique may initially request permission from users to retrieve, store, and process the user's viewing habits to generate preferences and ultimately provide preference-based virtual objects. This may be accomplished with a disclaimer or other similar method and/or technique.

Figure 4:
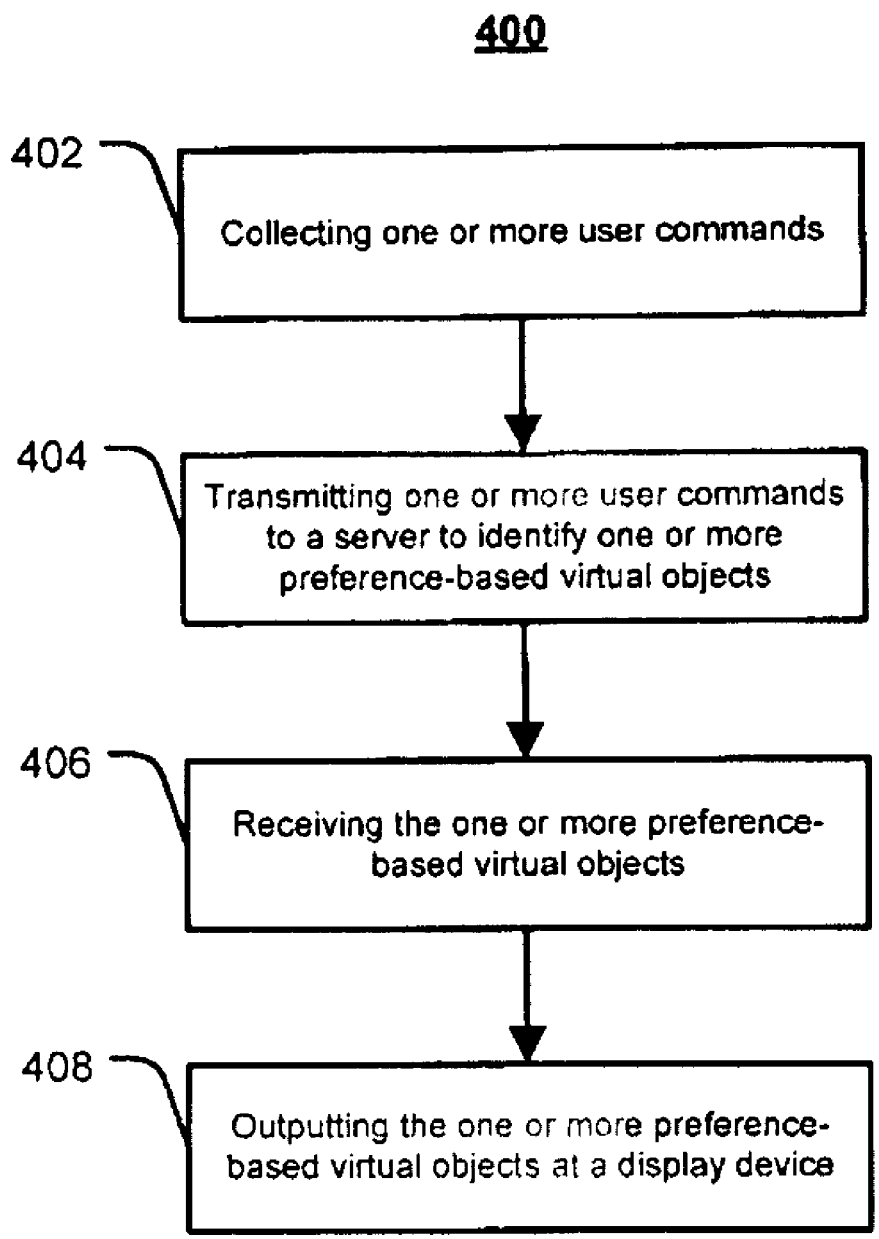
FIG. 4 depicts a flowchart of a method for selling preference-based virtual objects, according to an exemplary embodiment.

FIG. 4 depicts a flowchart of a method 400 for selling preference-based virtual objects, according to an exemplary embodiment. At block 402, one or more user commands, e.g., to select a program, purchase a virtual object, and/or any other preference related action, may be collected from a user. For example, system 100 may receive a user's selection of a virtual object for purchase via a remote control device 110, media box 120, and/or any other input device. At block 404, the one or more user commands may be transmitted to at least one server. For example, a media control station 122 may transmit the one or more user commands to one or more servers associated with the system 100, such as, a Billing Server 142. At block 406, the one or more preference-based virtual objects may be transmitted. For example, the system 100 may transmit the one or more purchased virtual objects to the user via a media control station 122 and/or a media box 120. At block 408, the one or more preference-based virtual objects may be outputted. For example, in response to receiving one or more user inputs from the user to display the one or more preference-based virtual objects, a display device 130 may display the one or more preference-based virtual objects to the user.

FIG. 5 depicts a flowchart of another method 500 for selling preference-based virtual objects, according to an exemplary embodiment. At block 502, one or more user commands may be collected. For example, a media box 120 may receive one or more user commands from a user using an input device, e.g., a remote control device 110, one or more buttons on a display device 130, one or more buttons on a media box 120, and may transmit the one or more user commands to the system 100. At block 504, one or more preference-based virtual objects may be identified based on the one or more user commands. For example, one or more processors associated with a Preference-based Virtual Object Identification Engine 140 may identify one or more preference-based virtual objects based on the one or more user commands. At block 506, the one or more preference-based virtual objects may be outputted. For example, in response to receiving one or more user inputs from the user to display the one or more preference-based virtual objects, a display device 130 may display the one or more preference-based virtual objects to the user.

There may be several models for identifying preference-based virtual objects. In various embodiments, Log Collecting Server 138 and Metrics and User Profile Server 140 may take into consideration the profile of various users in a user-based collaborative filtering scheme. For example, identifying the one or more preference-based virtual objects may include matching a profile of the user with one or more profiles of similar users within a community. As a result, a user may be matched with other similar users to identify preference-based virtual objects using at least one of the following criteria: gender, favorites, interests, hobbies, education, etc. By using the profiles of other users, preference-based virtual objects may be identified efficiently.

Furthermore, identifying preference-based virtual objects for various users within a household may be achieved dynamically. In various embodiments, each user of the household may have a separate login identification and/or password for the media box 120. In this example, each user of the household may have a separate user profile in the media box 120. Once the media box 120 receives instructions to access a user profile (e.g., via personal identification, password, or other manual or automatic detection), the media box 120 may also access that user's preferences and dynamically provide his or her preference-based virtual objects. This may be particular useful in households with many residents. In another embodiment, identification and passwords may not be necessary.

Advantages in business and marketing may also be apparent. For example, knowing a user's preferences may provide a unique way of not only providing preference-based virtual objects, but also for providing targeted advertisements. In this example, users who watch certain types of programming may be more inclined to fit a particular type of lifestyle as well. As a result, a user who frequently watches sports programming may enjoy a lifestyle of being physically active, driving sports cars, eating various foods, drinking beer, etc. Thus, providing advertisements in at least these exemplary categories may not only increase the user's viewing pleasure by providing advertisements that are tailored to the user's interests, but may also benefit the business of the advertiser. Accordingly, improved services that conventional systems and techniques simply have not contemplated may also be provided.

It should also be appreciated that while preference-based virtual objects are viewed from a display device 130 by a media box 120, preference-based virtual objects may by viewed from a variety of other devices as well. For example, preference-based virtual objects may also be provided at desktops, laptops, and/or mobile communications devices. In various embodiments, user preferences may also be inputted from other devices as well. Other various embodiments may also be provided.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A method, comprising:
   receiving one or more user commands from an input device;
   transmitting, to at least one server, the one or more user commands to identify a plurality of preference-based virtual objects based on the one or more user commands, wherein the one or more preference-based virtual objects comprise at least one of avatars, seasonal virtual objects, ring tones, and gift cards;
   identifying one or more of the plurality of preference-based virtual objects by matching, wherein the matching includes at least one of matching a profile of a user with one or more profiles of similar users within a community, matching one or more programs selected by the user with one or more similar programs within the community, and matching based on one or more recommendations from at least one of a host service provider, a third party, and a community poll;
   receiving a user command selecting at least one of the one or more preference-based virtual objects that was previously identified by matching;
   receiving one or more preference-based virtual objects in response to the identification of the one or more preference-based virtual objects; and
   outputting, to a display device, the one or more preference-based virtual objects in response to receiving one or more user inputs to display the one or more preference-based virtual objects to the display device.

2. The method of claim 1, wherein matching one or more programs selected by the user with one or more similar programs within the community is further based on matching content in the one or more programs with the one or more similar programs.

3. The method of claim 1, wherein matching one or more programs selected by the user with one or more similar programs within the community is further based on matching ratings provided by the user for the one or more programs with ratings provided by additional users for the one or more similar programs.

4. The method of claim 1, wherein matching one or more programs selected by the user with one or more similar programs within the community is further based on matching relationships provided by a third party.

5. The method of claim 1, further comprising associating one or more user profiles of a community by tagging the one or more user profiles based on one of more ring tones associated with the one or more user profiles.

6. The method of claim 1, further comprising transmitting purchasing information associated with the user purchasing one or more virtual objects to at least one server.

7. A computer readable media comprising code to perform the acts of the method of claim 1.

8. A system, comprising:
   a first receiver to receive one or more user commands from an input device;
   a transmitter to transmit, to at least one server, the one or more user commands to identify a plurality of preference-based virtual objects based on the one or more user commands, wherein the one or more preference-based virtual objects comprise at least one of avatars, seasonal virtual objects, ring tones, and gift cards;
   at least one server to identify one or more of the plurality of preference-based virtual objects by matching, wherein the matching includes at least one of matching a profile of a user with one or more profiles of similar users within a community, matching one or more programs selected by the user with one or more similar programs within the community, and matching based on one or more recommendations from at least one of a host service provider, a third party, and a community poll;
   a second receiver to receive a user command selecting at least one of the one or more preference-based virtual objects that was previously identified by matching and receive the one or more preference-based virtual objects in response to the selection of the one or more preference-based virtual objects; and
   an output configured to display, at a display device, the one or more selected preference-based virtual objects in response to receiving one or more user inputs to display the one or more preference-based virtual objects.

9. A method, comprising:
   receiving one or more user commands at one or more modules;
   identifying, at the one or more modules, one or more of a plurality of preference-based virtual objects based on the one or more user commands by matching, wherein the matching includes at least one of matching a profile of a user with one or more profiles of similar users within a community, matching one or more programs selected by the user with one or more similar programs within the community, and matching based on one or more recommendations from at least one of a host service provider, a third party, and a community poll, and wherein the one or more preference-based virtual objects comprise at least one of avatars, seasonal virtual objects, ring tones, and gift cards;
   receiving a user command selecting at least one of the one or more preference-based virtual objects that was previously identified by matching; and
   transmitting the one or more selected preference-based virtual objects to be displayed at a display device in response to receiving one or more user inputs to display the one or more selected preference-based virtual objects.

10. The method of claim 9, wherein matching one or more programs selected by the user with one or more similar programs within the community is further based on matching content in the one or more programs with the one or more similar programs.

11. The method of claim 9, wherein matching one or more programs selected by the user with one or more similar programs within the community is further based on matching ratings provided by the user for the one or more programs with ratings provided by additional users for the one or more similar programs.

12. The method of claim 9, wherein matching one or more programs selected by the user with one or more similar programs within the community is further based on matching relationships provided by a third party.

13. The method of claim 9, further comprising associating one or more user profiles of a community by tagging the one or more user profiles based on one of more ring tones associated with the one or more user profiles.

14. A computer readable media comprising code to perform the acts of the method of claim 9.

15. A system, comprising:
   a receiver to receive and collect one or more user commands at one or more modules;
   at least one processor to identify, at the one or more modules, one or more of a plurality of preference-based virtual objects based on the one or more user commands by matching, wherein the matching includes at least one of matching a profile of a user with one or more profiles of similar users within a community, matching one or more programs selected by the user with one or more similar programs within the community, and matching based on one or more recommendations from at least one of a host service provider, a third party, and a community poll, and wherein the one or more preference-based virtual objects comprise at least one of avatars, seasonal virtual objects, ring tones, and gift cards and receive a user command selecting at least one of the one or more preference-based virtual objects that was previously identified by matching; and a transmitter to transmit the one or more selected preference-based virtual objects to be displayed at a display device in response to receiving one or more user inputs to display the one or more selected preference-based virtual objects.

16. The method of claim 15, wherein matching one or more programs selected by the user with one or more similar programs within the community is further based on matching content in the one or more programs with the one or more similar programs.

17. The method of claim 15, wherein matching one or more programs selected by the user with one or more similar programs within the community is further based on matching ratings provided by the user for the one or more programs with ratings provided by additional users for the one or more similar programs.

18. The method of claim 15, wherein matching one or more programs selected by the user with one or more similar programs within the community is further based on matching relationships provided by a third party.

* * * * *